US008698025B2

(12) United States Patent
Saito et al.

(10) Patent No.: US 8,698,025 B2
(45) Date of Patent: Apr. 15, 2014

(54) INPUT DEVICE

(75) Inventors: Shoji Saito, Niigata-ken (JP); Michio Kamimura, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 238 days.

(21) Appl. No.: 13/298,215

(22) Filed: Nov. 16, 2011

(65) Prior Publication Data

US 2012/0247938 A1 Oct. 4, 2012

(30) Foreign Application Priority Data

Mar. 30, 2011 (JP) ................................. 2011-073854

(51) Int. Cl.
*H01H 3/08* (2006.01)
*H01H 19/00* (2006.01)
*H01H 19/14* (2006.01)
*H01H 21/00* (2006.01)

(52) U.S. Cl.
USPC ....................................................... 200/336

(58) Field of Classification Search
USPC .......... 200/600, 46, 5 R, 292, 511–512, 11 D, 200/11 DA, 5 A
See application file for complete search history.

(56) References Cited

U.S. PATENT DOCUMENTS

| 7,609,178 | B2 * | 10/2009 | Son et al. ........................ 341/33 |
| 8,040,321 | B2 * | 10/2011 | Peng et al. ..................... 345/169 |
| 8,124,903 | B2 * | 2/2012 | Tatehata et al. ............... 200/600 |
| 8,466,882 | B2 * | 6/2013 | Halsey et al. ................. 345/173 |
| 2009/0314621 | A1 * | 12/2009 | Hotelling ....................... 200/600 |
| 2011/0141055 | A1 * | 6/2011 | Hsu ................................ 345/174 |
| 2011/0199320 | A1 * | 8/2011 | Cho et al. ...................... 345/173 |
| 2011/0290631 | A1 * | 12/2011 | Kuriki ........................... 200/600 |

FOREIGN PATENT DOCUMENTS

JP 2010-277461 12/2010

* cited by examiner

*Primary Examiner* — Edwin A. Leon
*Assistant Examiner* — Anthony R. Jimenez
(74) *Attorney, Agent, or Firm* — Beyer Law Group LLP

(57) ABSTRACT

An input device includes a first transparent substrate, a first transparent electrode layer for detecting change of a capacitance value, and a first drawn wiring layer electrically connected to an end of the first transparent electrode layer. The first transparent electrode layer is formed on an input region of the first transparent substrate, and the first drawn wiring layer is formed on a non-input region surrounding the input region. The first transparent electrode layer and the first drawn wiring layer are connected to each other through a first pad portion for connection, and a second pad portion for electrical property inspection is electrically connected to the other end of the first transparent electrode layer.

8 Claims, 11 Drawing Sheets

INPUT DEVICE

CLAIM OF PRIORITY

This application claims benefit of Japanese Patent Application No. 2011-073854 filed on Mar. 30, 2011, which is hereby incorporated by reference.

BACKGROUND OF THE INVENTION

1. Field of the Invention

The present invention relates to an input device, and particularly relates to an input device that allows electrical property inspection of a transparent electrode layer to be easily performed and that allows the uniformity of a capacitance distribution to be improved.

2. Description of the Related Art

At present, light-transmissive type input devices for performing a coordinate input when a menu item or an object in a display image is operated directly with a finger or the like are used as display units of portable electronic apparatuses and the like. There are some operation modes of such input devices. Among them, capacitance type input devices are widely used.

FIG. 11 shows an exploded perspective view of a capacitance type input device 101 disclosed in Japanese Unexamined Patent Application Publication No. 2010-277461. As shown in FIG. 11, the input device 101 of the related art example includes a scanning side board 130 and a detection side board 140. A plurality of scanning electrodes 131 extending in a Y1-Y2 direction are formed on the scanning side board 130, and a plurality of detection electrodes 141 extending in an X1-X2 direction are formed on the detection side board 140. Scanning side connection electrodes 133 for connecting to a flexible printed board (not shown) are formed at the ends of the scanning electrodes 131 on the Y2 side, respectively, and detection side connection electrodes 143 are similarly formed at the ends of the detection electrodes 141 on the X1 side.

The scanning side board 130 and the detection side board 140 are disposed so as to face each other such that capacitances are provided between the scanning electrodes 131 and the detection electrodes 141. When a finger or the like is caused to contact the surface of the input device 101, a capacitance value between the scanning electrode 131 and the detection electrode 141 at the touched position changes. On the basis of the change of the capacitance value, the input position can be detected. In the input device 101 of the related art, a shield layer 163 is formed so as to surround the detection electrodes 141, thereby preventing false detection or change in detection sensitivity that is caused by external noise.

However, the scanning electrodes 131 and the detection electrodes 141 are formed of a transparent electrode film of ITO (Indium Tin Oxide) or the like, and the scanning side connection electrodes 133 and the detection side connection electrodes 143 are formed of a low-resistance metal material such as copper and silver for ensuring connection reliability. Thus, near the ends of the scanning electrodes 131 on the Y2 side to which the scanning side connection electrodes 133 are connected, a capacitance value between the scanning side board 130 and the detection side board 140 changes due to the difference between the dielectric constants and influence of the thicknesses of the materials.

In other words, different capacitance distributions are formed at both ends of the scanning electrodes 131 in the Y1-Y2 direction. Thus, the capacitance values in an input region of the input device 101 become ununiform, and decrease in detection sensitivity, false detection, or the like may occur.

Further, when electrical property inspection of the scanning electrodes 131 is performed on the scanning side board 130, it is necessary to cause a probe pin for inspection to contact each scanning electrode 131, since the scanning side connection electrode 133 is formed at one end of each scanning electrode 131 but no electrode is formed at the other end of each scanning electrode 131. However, the transparent electrode film is in general a material in which a crack is likely to occur. Thus, when the probe pin is caused to directly contact each scanning electrode 131 to perform measurement, the electrical properties and the environmental resistance of each scanning electrode 131 may deteriorate. Thus, it is difficult to perform the inspection at an early stage prior to assembling the input device 101, and the inspection is performed after assembling the input device 101. As a result, finding a defect is delayed, and the manufacturing cost increases.

SUMMARY OF THE INVENTION

The present invention solves the problems described above and provides an input device that allows electrical property inspection of a transparent electrode layer to be easily performed and that allows the uniformity of a capacitance distribution to be improved.

An input device of the present invention includes a light-transmissive substrate, a transparent electrode layer for detecting change of a capacitance value, and a wiring layer electrically connected to an end of the transparent electrode layer. The transparent electrode layer is formed on an input region of the substrate, and the wiring layer is formed on a non-input region surrounding the input region. The transparent electrode layer and the wiring layer are connected to each other through a first pad portion for connection, and a second pad portion for electrical property inspection is electrically connected to another end of the transparent electrode layer.

According to this, since the first pad portion is connected to the end of the transparent electrode layer and the second pad portion is connected to the other end of the transparent electrode layer, the dielectric constants and thicknesses of members located near both ends of the transparent electrode layer can be the same. Thus, the uniformity of capacitance distributions at both ends of the transparent electrode layer can be improved. Therefore, the uniformity of a capacitance distribution in the input region of the input device can be improved, and hence it is also possible to improve the uniformity of a detection sensitivity distribution.

Further, since the first pad portion and the second pad portion are formed at both ends of the transparent electrode layer, it is possible to easily measure an electrical property of the transparent electrode layer while causing probe pins to contact the first pad portion and the second pad portion, respectively, without providing any damage to the transparent electrode layer.

Further, in the input device of the present invention, the first pad portion and the second pad portion are preferably connected to the transparent electrode layer so as to have substantially the same widths. By so doing, the dielectric constants and thicknesses of the members located near both ends of the transparent electrode layer can more assuredly be the same. Thus, the uniformity of the distributions of capacitance values at both ends of the transparent electrode layer can more assuredly be improved. Therefore, it is possible to improve the uniformity of the capacitance distribution in the input region.

In the input device of the present invention, the first pad portion and the second pad portion are preferably connected to the transparent electrode layer so as to have widths that are substantially the same as that of the transparent electrode layer. By so doing, the uniformity of the capacitance distribution is improved in the width direction of the transparent electrode layer. Thus, it is possible to more effectively improve the uniformity of the capacitance distribution. In addition, the first pad portion and the second pad portion are formed so as to have widths sufficient to cause probe pins for inspection to contact them. Thus, it is possible to more easily perform electrical property inspection of the transparent electrode layer.

In the input device of the present invention, the first pad portion and the second pad portion are preferably formed of a metal material. According to this, connection reliability between the transparent electrode layer and the wiring layer can assuredly be ensured. In addition, the contact resistances between probe pins and the first pad portion and the second pad portion can be decreased. Thus, it is possible to more assuredly perform electrical property measurement.

Further, in the input device of the present invention, preferably, on the surface of the substrate, when two directions that intersect each other in a plane are a first direction and a second direction, a plurality of the transparent electrode layers extending in the first direction are arranged at intervals in the second direction, connection portions for connecting to a flexible printed board are formed on the non-input region, and a plurality of the wiring layers are drawn around on the non-input region and connected to the connection portions. By so doing, the uniformity of the capacitance distribution in the input region can be further improved. In addition, when probe pins for electrical property inspection are caused to contact the connection portions between the first pad portion and the second pad portion and the flexible printed board, electrical property inspection of the transparent electrode layers and the wiring layers can efficiently be performed. Thus, it is possible to reduce the manufacturing cost.

DESCRIPTION OF THE PREFERRED EMBODIMENTS

<First Embodiment>

Figure 1:
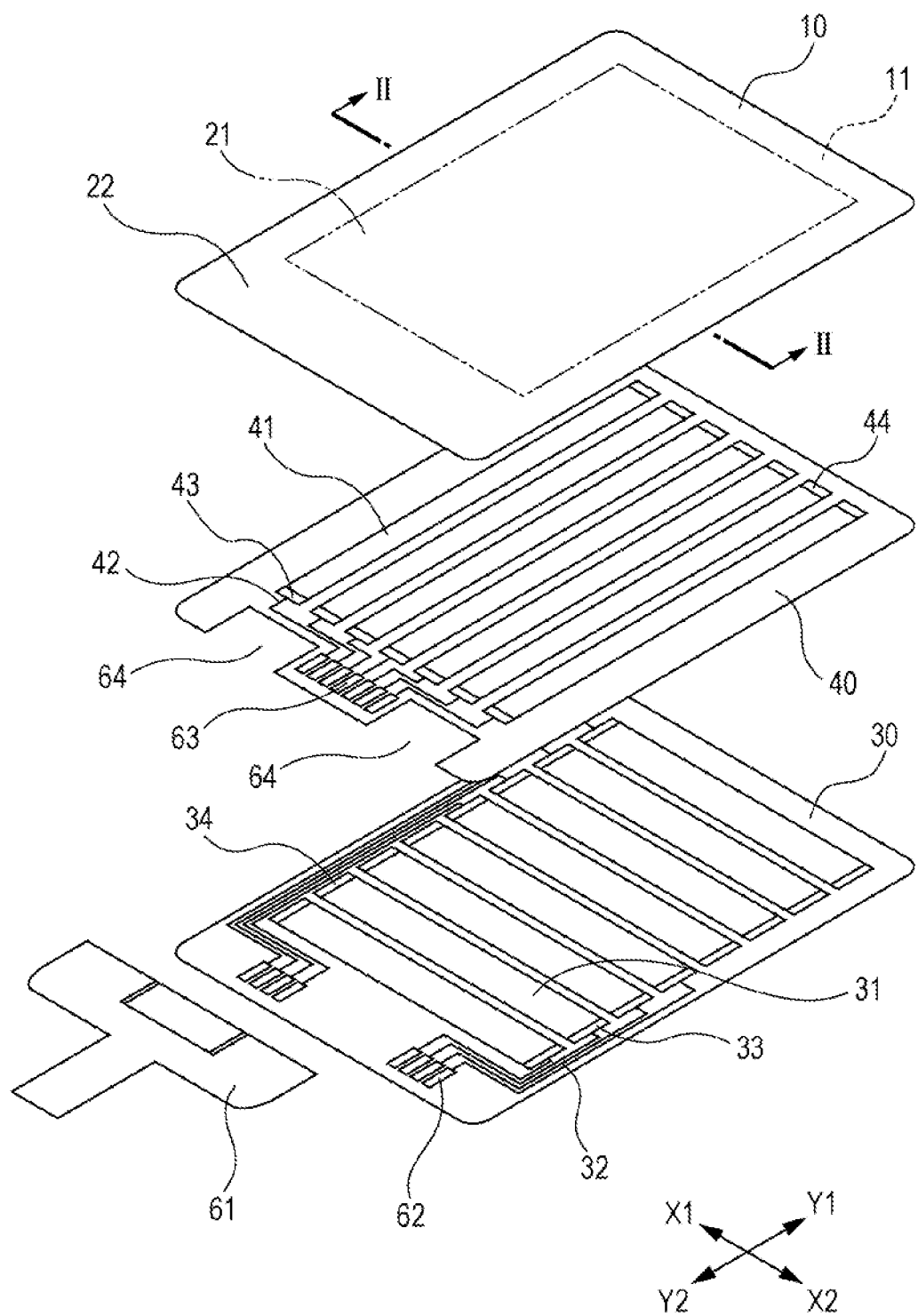
FIG. 1 is an exploded perspective view of an input device according to a first embodiment of the present invention.
Figure 2:
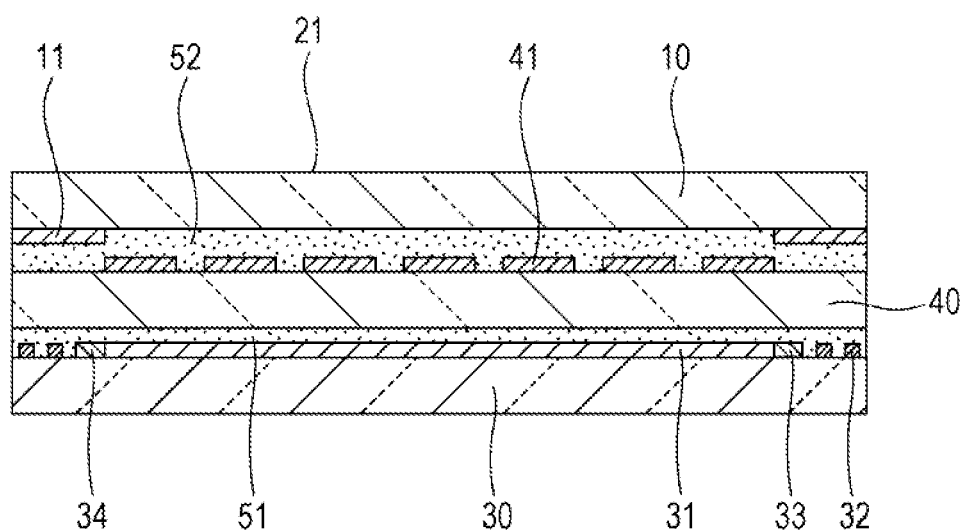
FIG. 2 is a cross-sectional view of the input device taken along the II-II line in FIG. 2.

FIG. 1 shows an exploded perspective view of an input device 1 according to a first embodiment. FIG. 2 shows a cross-sectional view of the input device 1 taken along the II-II line in FIG. 1. It should be noted that for clarity of the drawings, each component is shown such that the ratio of the dimensions of each component is appropriately changed from the actual ratio.

As shown in FIG. 1, the input device 1 according to the embodiment includes a first transparent substrate 30 on which first transparent electrode layers 31 are formed and a second transparent substrate 40 on which second transparent electrode layers 41 are formed, and the first transparent substrate 30 and the second transparent substrate 40 are laminated to each other. On an input surface side of the second transparent substrate 40, a surface member 10 for protecting the surface is laminated.

The first transparent electrode layers 31 and the second transparent electrode layers 41 are formed in an input region 21 in which position information can be inputted. The surrounding of the input region 21 is a frame-shaped non-input region 22, and a decorating layer 11 is formed on the non-input region 22 of the surface member 10.

First FPC connection portions 62 for connecting to a flexible printed board 61 (hereinafter, referred to as FPC 61) are formed on the non-input region 22 of the first transparent substrate 30 on the Y2 side. First drawn wiring layers 32 are drawn around on the non-input region 22 of the first transparent substrate 30, and the first transparent electrode layers 31 and the first FPC connection portions 62 are electrically connected to each other therethrough. Similarly, second FPC connection portions 63 are formed on the non-input region 22 of the second transparent substrate 40 on the Y2 side, and the second transparent electrode layers 41 and the second FPC connection portions 63 are electrically connected to each other through second drawn wiring layers 42 drawn around on the non-input region 22.

As shown in FIG. 1, the second FPC connection portions 63 are located so as to be aligned with the first FPC connection portions 62 in a planar view, and the second transparent substrate 40 has notches 64 at positions overlapping with the first FPC connection portions 62. Thus, a connection portion formed on a surface of the FPC 61 can easily be connected to the first FPC connection portions 62 and the second FPC connection portions 63. In addition, an IC (Integrated Circuit) that is not shown is connected to the FPC 61, and input position information can be detected on the basis of change of a capacitance value between the first transparent electrode layer 31 and the second transparent electrode layer 41.

As shown in FIG. 2, the first transparent substrate 30 and the second transparent substrate 40 are attached to each other through a first optical pressure-sensitive adhesive layer 51, and the second transparent substrate 40 and the surface member 10 are attached to each other through a second optical pressure-sensitive adhesive layer 52. For the first optical pressure-sensitive adhesive layer 51 and the second optical pressure-sensitive adhesive layer 52, a light-transmissive acrylic type optical pressure-sensitive adhesive or an acrylic type double-sided tape can be used.

For the first transparent substrate 30 and the second transparent substrate 40, a light-transmissive film-shaped resin material is used, and, for example, a PET (polyethylene terephthalate) film can be used. Their thicknesses are about 50 µm to 200 µm.

Further, the first transparent electrode layers 31 and the second transparent electrode layers 41 are formed of a transparent electrode film of ITO (Indium Tin Oxide), SnO2, ZnO, or the like having a light-transmissive property in the visible light range. The first transparent electrode layers 31 and the second transparent electrode layers 41 are formed by a thin film method such as sputtering or vapor deposition, and their thicknesses are 0.01 µm to 0.05 µm and, for example, about 0.02 µm. Alternatively, as a method other than sputtering and vapor deposition, a film on which transparent electrode films are formed is previously prepared and only the transparent electrode films are transferred onto a transparent substrate, or it is possible to form these electrode layers by a method in which a conductive polymer, an Ag nanowire, or the like is applied.

Further, the surface member 10 is a board that has a larger thickness and a higher rigidity than the first transparent substrate 30 and the second transparent substrate 40, and, for example, a light-transmissive board, such as a resin board of PC (polycarbonate) or the like, a glass board, or a composite board of a resin and glass, is used.

It should be noted that the term "light-transmissive" or "transparent" indicates a state where the transmittance of visible light is equal to or higher than 80%. Further, it is preferred that the haze value is equal to or lower than 6.

As shown in FIG. 2, the first transparent electrode layers 31 and the second transparent electrode layers 41 are located so as to face each other across the insulative first optical pressure-sensitive adhesive layer 51 and the second transparent substrate 40 such that capacitances are formed therebetween. For an input operation on the capacitance type input device 1, when a finger is caused to get close to or contact the input region 21 of an input surface, a capacitance between the finger and the first transparent electrode layer 31 is added to the capacitance between the first transparent electrode layer 31 and the second transparent electrode layer 41, and thus change of the capacitance occurs. It is possible to calculate the input position on the basis of the change of the capacitance.

Next, the configuration of the members laminated on the first transparent substrate 30 and the second transparent substrate 40 will be described with reference to the drawings.

Figure 3:
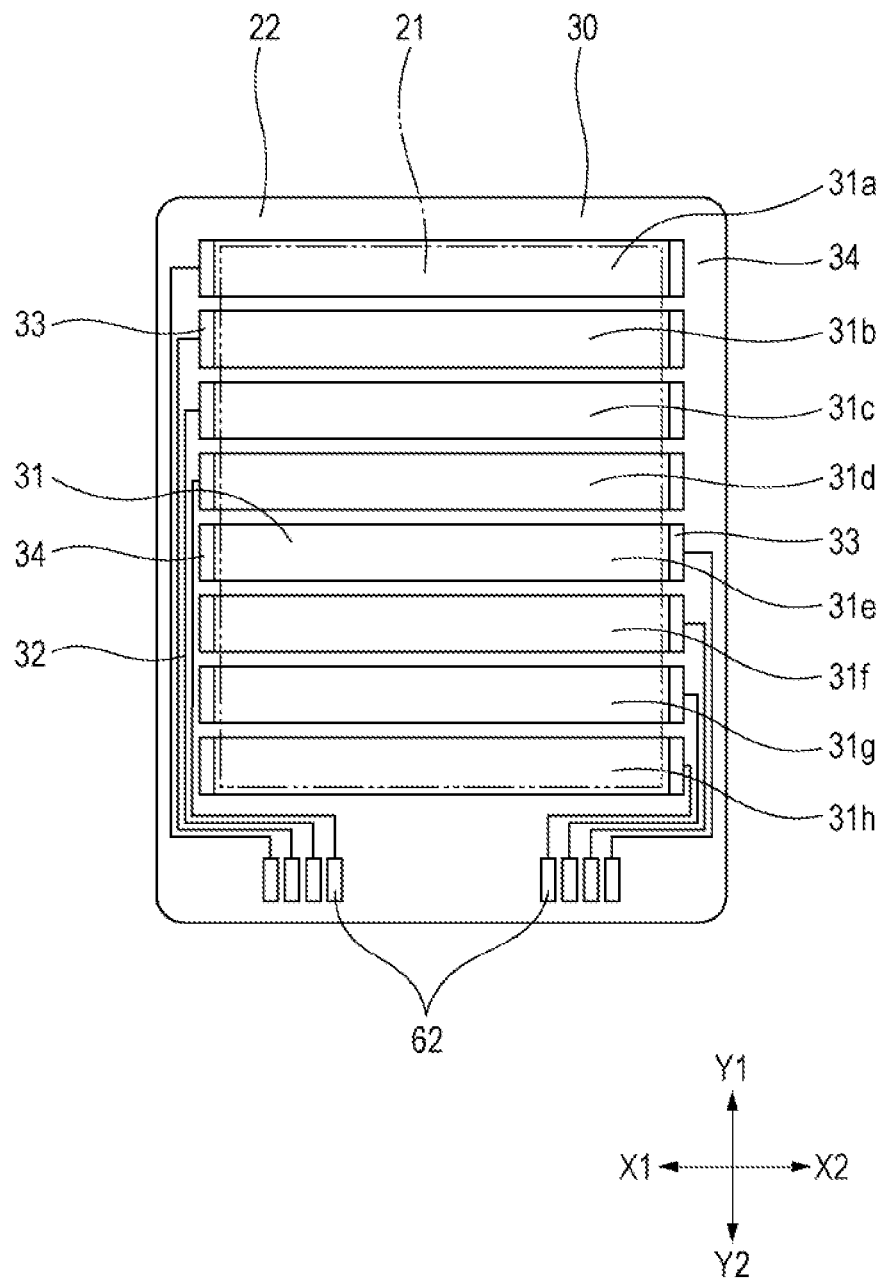
FIG. 3 is a plan view of a first transparent substrate according to the first embodiment.

FIG. 3 shows a plan view of the first transparent substrate 30 of the input device 1. As shown in FIG. 3, the first transparent electrode layers 31 are constituted of a plurality of band-shaped transparent electrode layers extending in an X1-X2 direction (first direction), and are arranged at intervals in a Y1-Y2 direction (second direction) that intersects the X1-X2 direction. The respective transparent electrode layers constituting the first transparent electrode layers 31 are designated by 31a to 31h from the Y1 side toward the Y2 side and will be described.

The first drawn wiring layers 32 are connected to the ends of the first transparent electrode layers 31a to 31d on the X1 side, respectively, drawn around on the non-input region 22 on the X1 side, and connected to the first FPC connection portions 62 formed on the non-input region 22 on the Y2 side. Similarly, the first drawn wiring layers 32 that are connected to the ends of the first transparent electrode layers 31e to 31h on the X2 side, respectively, are drawn around on the non-input region 22 on the X2 side and connected to the first FPC connection portions 62.

As shown in FIG. 3, at the connection portions between the first transparent electrode layers 31a to 31h and the first drawn wiring layers 32, first pad portions 33 are formed for improving connection reliability. Further, at the ends of the first transparent electrode layers 31a and 31h to which the first drawn wiring layers 32 are not connected, second pad portions 34 for electrical property inspection are formed. In the embodiment, the widths (the widths in the Y1-Y2 direction) of the first pad portions 33 and the second pad portions 34 are the same as the widths of the first transparent electrode layers 31a to 31h in the Y1-Y2 direction.

The first drawn wiring layers 32, the first pad portions 33, and the second pad portions 34 can be formed by a thin film method such as sputtering or vapor deposition using a low-resistance metal material such as silver and copper for ensuring connection reliability. Alternatively, it is also possible to form these members by a printing method such as screen printing or ink jet printing using a conductive paste composed of silver, copper, or the like. Since assured connection is ensured by using the low-resistance metal material and sufficient conduction is obtained even when the widths of the first drawn wiring layers 32 are decreased, it is possible to narrow the frame of the input device. It should be noted that each of the first drawn wiring layers 32, the first pad portions 33, and the second pad portions 34 may have a lamination structure with a first wiring layer formed of the same material as that of the first transparent electrode layers 31 and a second wiring layer that is laminated on the first wiring layer and that is formed of a metal material.

As shown in FIG. 3, since the first pad portions 33 and the second pad portions 34 are formed on both ends of the first transparent electrode layers 31a to 31h, when electrical properties are measured, it is possible to easily perform the measurement while causing probe pins to contact the first pad portions 33 and the second pad portion 34. Since the metal material is used for the first pad portions 33 and the second pad portion 34, the contact resistances with the probe pins are reduced to be small, and the measurement can easily and assuredly be performed. In addition, since the metal material such as silver or copper has high toughness, even when the probe pins are caused to contact the first pad portions 33 and the second pad portions 34, occurrence of cracks and dents in the first transparent electrode layers 31 can be suppressed, and it is possible to perform the measurement without providing any damage to the first transparent electrode layers 31.

Further, by causing probe pins for electrical property measurement to contact the first FPC connection portions 62, the first pad portions 33, and the second pad portions 34, it is possible to measure the electrical properties of the first drawn wiring layers 32 and the first transparent electrode layers 31 in a short time. Therefore, it is possible to easily and quickly inspect defects of the first transparent electrode layers 31 and the first drawn wiring layers 32 prior to assembling the input device 1. Thus, the yield can be improved in a process for manufacturing the input device 1, and this leads to reduction of the manufacturing cost.

Figure 4:
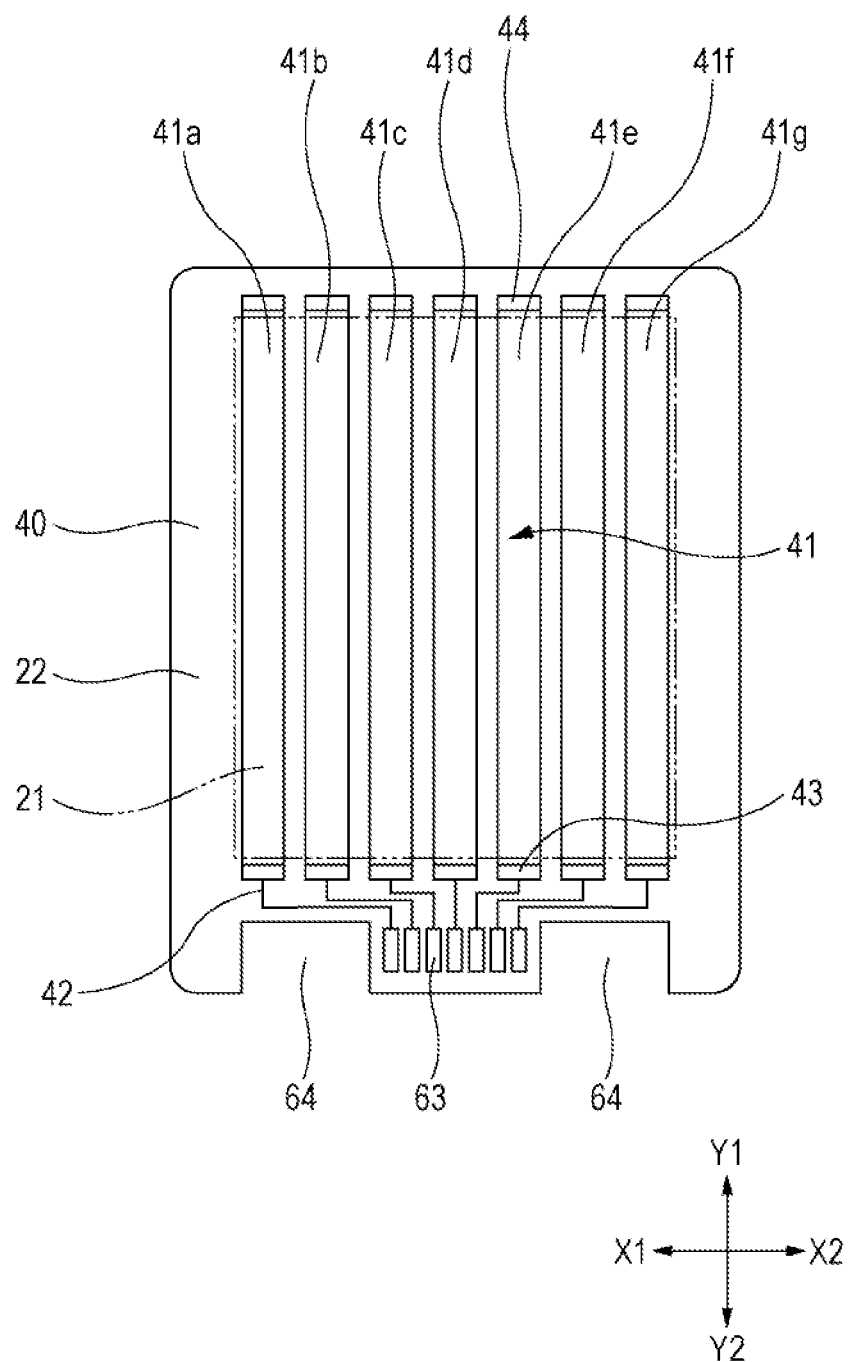
FIG. 4 is a plan view of a second transparent substrate according to the first embodiment.

Further, FIG. 4 shows a plan view of the second transparent substrate 40. As shown in FIG. 4, the second transparent electrode layers 41 are constituted of a plurality of band-shaped second transparent electrode layers 41a to 41f that extend in the Y1-Y2 direction and that are arranged at intervals in the X1-X2 direction. The second drawn wiring layers 42 are connected to the ends of the second transparent electrode layers 41a to 41f on the Y2 side, drawn around on the non-input region 22 on the Y2 side, and connected to the second FPC connection portions 63. At the connection portions between the second transparent electrode layers 41a to 41f and the second drawn wiring layers 42, third pad portions 43 are formed for ensuring connection reliability. In addition, at the ends of the second transparent electrode layers 41a to 41f on the Y1 side, fourth pad portions 44 for electrical property inspection are formed.

The second drawn wiring layers 42, the third pad portions 43, and the fourth pad portions 44 are formed of a low-resistance metal material such as silver or copper. In addition, since the third pad portions 43 and the fourth pad portions 44 are formed on both ends of the second transparent electrode layers 41, it is possible to easily measure electrical properties, and the measurement can be performed without providing any damage such as crack and dent to the second transparent electrode layers 41.

The first transparent substrate 30 shown in FIG. 3 and the second transparent substrate 40 shown in FIG. 4 are laminated to each other through the first optical pressure-sensitive adhesive layer 51, whereby capacitances are formed at intersections between the first transparent electrode layers 31a to 31h and the second transparent electrode layers 41a to 41f, respectively. The capacitance type input device 1 can detect input position information on the basis of change of the capacitance at each intersection. In addition, in order to prevent an erroneous operation or an erroneous input from occurring when a face or a hand is caused to get close to the input surface except for an input operation, it is necessary to provide a detection threshold and make setting such that a capacitance change equal to or less than the threshold is not considered as an input operation. However, when the capacitances formed at the intersections between the first transparent electrode layers 31a to 31h and the second transparent electrode layers 41a to 41f are ununiform, a normal input operation may not be detected at a part of the input region 21 or an erroneous operation other than an input operation may be likely to occur.

Further, as shown in FIG. 3, in the input device 1 of the embodiment, the drawn wiring layers 32 are connected to the ends of the first transparent electrode layers 31a to 31h on the X1 side or X2 side, but the other ends thereof are electrically opened. At such transparent electrode layer ends, the behavior of an electric field is unstable, and these ends are easily influenced by the members formed on the non-input region 22 and external noise. Thus, it is known that the distribution of the capacitance values is likely to be ununiform.

Figure 5A:
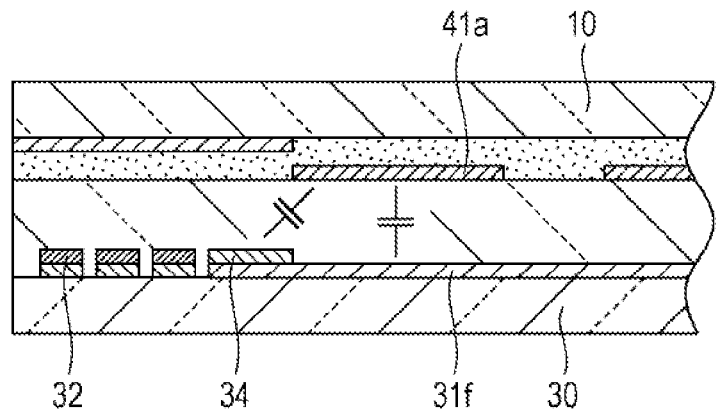
FIGS. 5A to 5C are schematic cross-sectional views of the input device near ends of first transparent electrode layers in an X1-X2 direction.
Figure 5B:
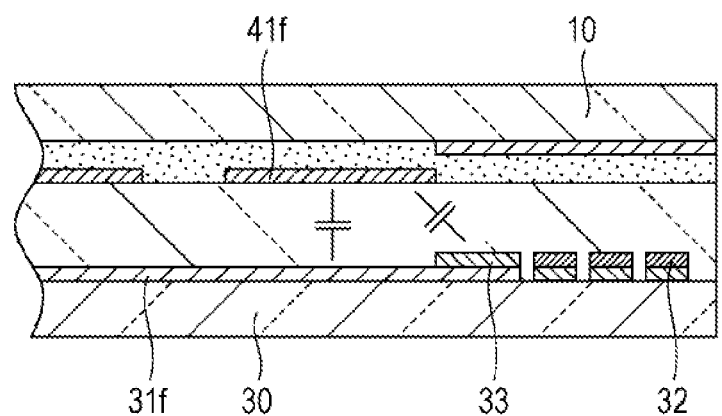
Figure 5C:
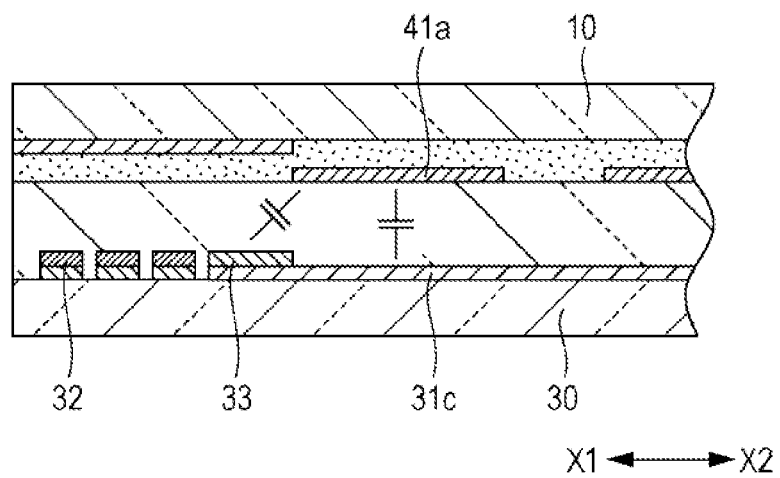

FIGS. 5A to 5C are schematic cross-sectional views near the ends of the first transparent electrode layers 31 in the X1-X2 direction. FIG. 5A is a schematic cross-sectional view near the end of the first transparent electrode layer 31f on the X1 side, FIG. 5B is a schematic cross-sectional view near the end of the first transparent electrode layer 31f on the X2 side, and FIG. 5C is a schematic cross-sectional view near the end of the first transparent electrode layer 31c on the X1 side. It should be noted that in FIGS. 5A to 5C, the second transparent substrate 40 and the first optical pressure-sensitive adhesive layer 51 are not shown.

As shown in FIG. 5A, near the end of the first transparent electrode layer 31f on the X1 side, the capacitance formed between the first transparent electrode layer 31f and the second transparent electrode layer 41a and the capacitance formed between the second pad portion 34 located near this end and the second transparent electrode layer 41a are coupled with each other to form a capacitance. In addition, as shown in FIG. 5B, similarly, near the end of the first transparent electrode layer 31f on the X2 side, the capacitance formed between the first transparent electrode layer 31f and the second transparent electrode layer 41f and the capacitance formed between the first pad portion 33 located near this end and the second transparent electrode layer 41f are coupled with each other to form a capacitance.

As shown in FIGS. 5A and 5B, since the first pad portion 33 is formed at the end of the first transparent electrode layer 31f on the X2 side and the second pad portion 34 is formed at the end of the first transparent electrode layer 31f on the X1 side, the members located near both ends of the first transparent electrode layer 31f can be formed such that their dielectric constants and thicknesses are the same. Therefore, the uniformity of the capacitance distributions at both ends of the first transparent electrode layer 31f can be improved. It should be noted that in FIGS. 5A and 5B, the first transparent electrode layer 31f is shown, but the first pad portions 33 and the second pad portions 34 are formed at the other first transparent electrode layers 31a to 31h, respectively, and thus it is possible to improve the uniformity of the capacitance distribution.

Further, as shown in FIG. 5C, the members located near the end of the first transparent electrode layer 31c on the X1 side also are formed such that their dielectric constants and thicknesses are the same as those shown in FIG. 5A, and thus the uniformity of the capacitance distribution can be improved. In other words, it is possible to improve the uniformity of the capacitance distribution in the Y1-Y2 direction at the ends of the first transparent electrode layers 31a to 31h on the X1 side or at the ends of the first transparent electrode layers 31a to 31h on the X2 side.

It is preferred that the opposing first pad portions 33 and second pad portions 34 are formed so as to have substantially the same widths. Due to this, the uniformity of the distribution of the capacitance values can assuredly be improved. In addition, it is preferred that as shown in FIG. 3, the first pad portions 33 and the second pad portions 34 are formed so as to have the same widths as those of the first transparent electrode layers 31a to 31h. By so doing, the uniformity of the capacitance distribution is improved also in the width direction of the first transparent electrode layer 31 end. Thus, it is possible to more effectively improve the uniformity of the capacitance distribution in the input region 21. Further, the probe pins for inspection are easily caused to contact the first pad portions 33 and the second pad portions 34. Thus, it is possible to more easily perform electrical property inspection. It should be noted that the shapes and sizes of the first pad portions 33 and the second pad portions 34 are not limited to the shapes and sizes shown in the embodiment.

Figure 6:
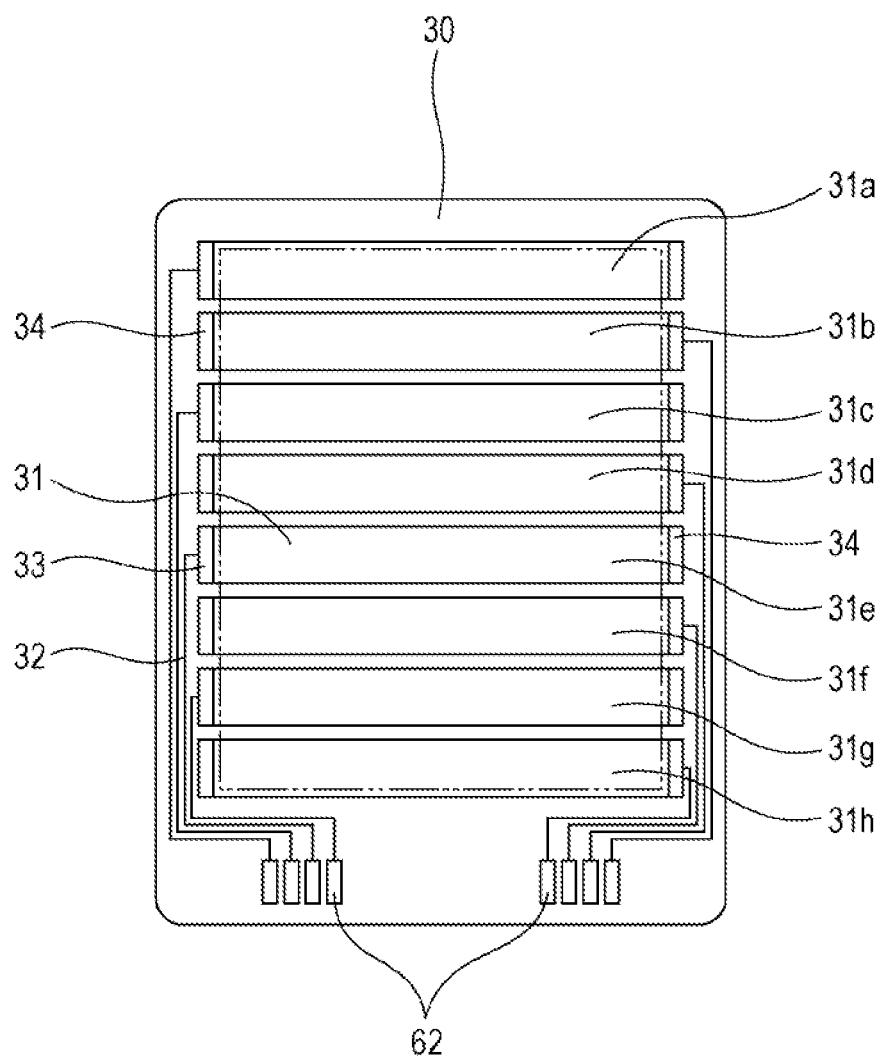
FIG. 6 is a plan view of a first transparent substrate according to a modified example of the first embodiment.

Further, in the embodiment, the first drawn wiring layers 32 are connected to the ends of the first transparent electrode layers 31a to 31d and the first transparent electrode layer 31e to 31h in the different directions. However, the present invention is not limited to such a configuration. As shown in FIG. 6, even when the directions of the connections of the first transparent electrode layers 31 and the first drawn wiring layers 32 are alternately changed, the same effect is obtained. In addition, the first drawn wiring layers 32 may be connected through the first pad portions 33 to all the ends of the first transparent electrode layer 31a to 31h in the same direction. In this case as well, when the second pad portions 34 are provided at the ends of the first transparent electrode layers 31 at which the first pad portions 33 are not formed, electrical property inspection of the transparent electrode layers can easily be performed, and the uniformity of the capacitance distribution can be improved.

<Second Embodiment>

Figure 7:
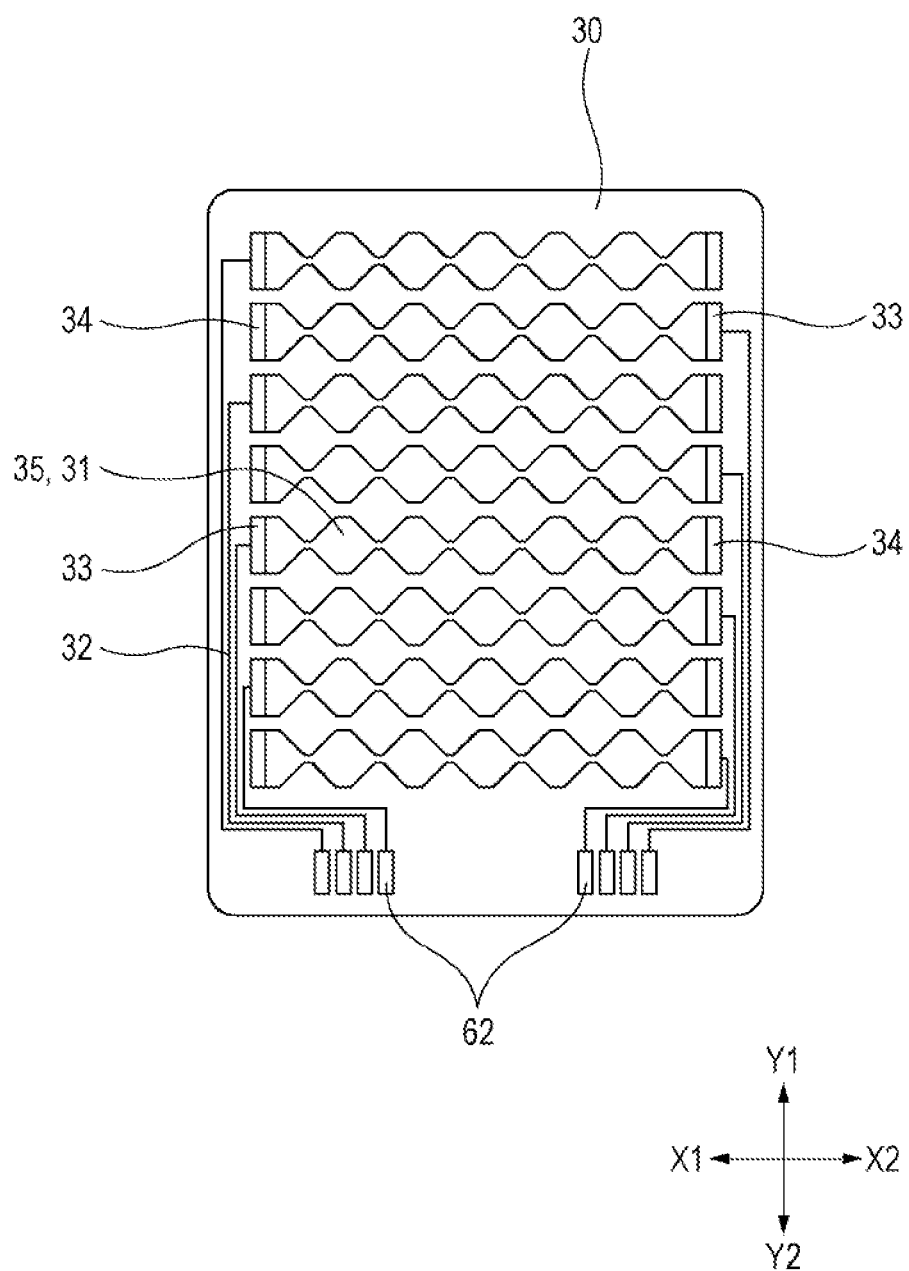
FIG. 7 is a plan view of a first transparent substrate according to a second embodiment.
Figure 8:
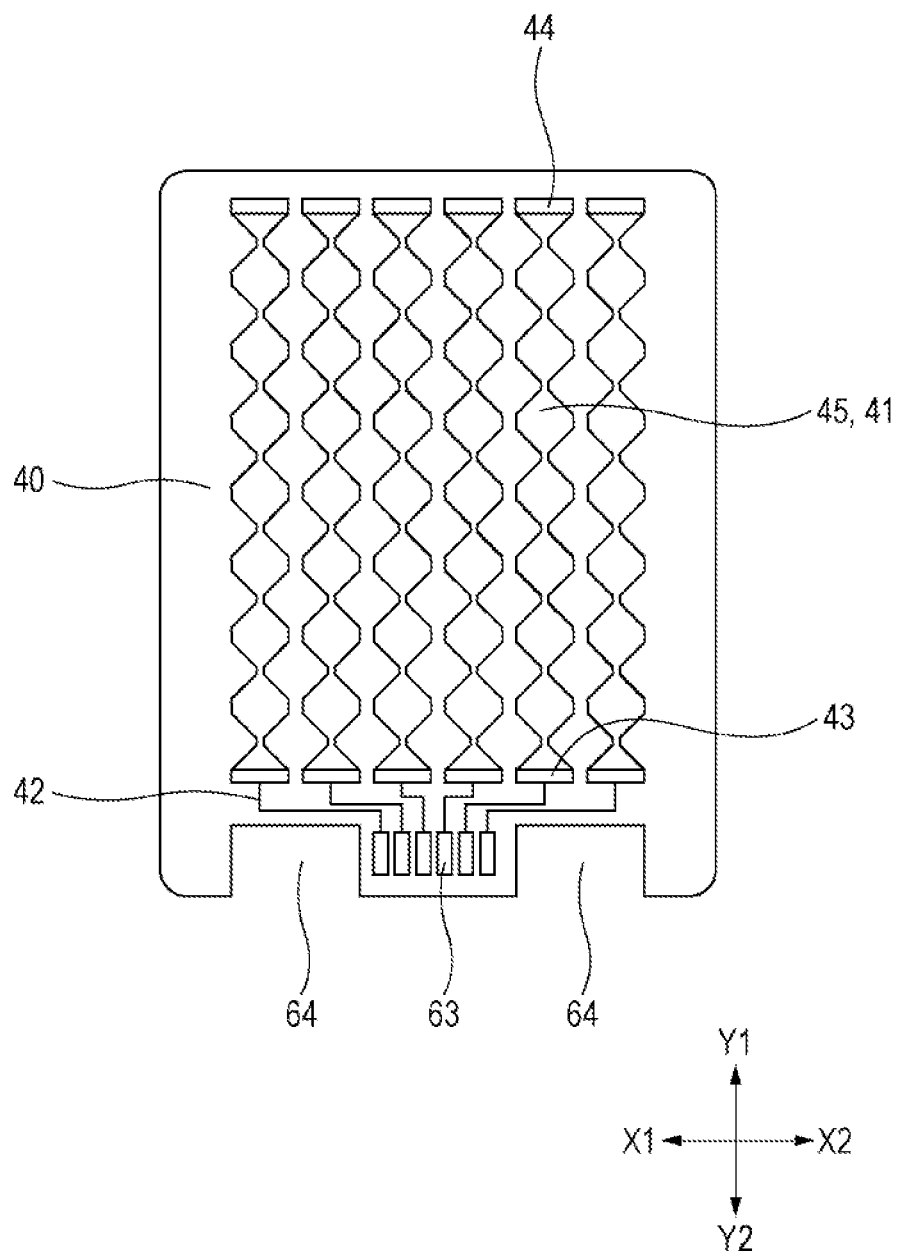
FIG. 8 is a plan view of a second transparent substrate according to the second embodiment.

FIG. 7 shows a plan view of a first transparent substrate 30 of an input device 1 according to a second embodiment, and FIG. 8 shows a plan view of a second transparent substrate 40 thereof. It should be noted that with regard to the same structures and members as those in the first embodiment, the description and the drawing thereof are omitted. As shown in FIG. 7, in first transparent electrode layers 31 according to the second embodiment, first electrode portions 35 having substantially rhombus shapes are connected to each other through thin connecting portions in the X1-X2 direction and arranged at intervals in the Y1-Y2 direction. In addition, as shown in FIG. 8, in second transparent electrode layers 41, second electrode portions 45 having substantially rhombus shapes are connected to each other through thin connecting portions in the Y1-Y2 direction and arranged at intervals in the X1-X2 direction.

In the embodiment, the first electrode portions 35 and the second electrode portions 45 are located at positions where they do not overlap each other in a planar view. In the input device 1 that is assembled by laminating the first transparent substrate 30 and the second transparent substrate 40, when a finger is caused to contact or get close to the input surface of the input device 1, capacitance values are formed between the finger and the first electrode portion 35 and between the finger and the second electrode portion 45 to change the capacitance value. On the basis of this capacitance change, input position information can be detected.

In the embodiment, the first electrode portions 35 and the second electrode portions 45 are formed so as to have the substantially rhombus shapes, but their shapes are not limited thereto.

In the embodiment as well, as shown in FIG. 7, first drawn wiring layers 32 are connected to ends of the first transparent electrode layers 31 through first pad portions 33 for connection, and second pad portions 34 for electrical property inspection are formed at the other ends thereof. In addition, as shown in FIG. 8, third pad portions 43 for connection are formed at ends of the second transparent electrode layers 41, and fourth pad portions 44 for electrical property inspection are formed at the other ends thereof.

Since each pad portion is formed thus, it is possible to easily inspect the electrical properties of the first transparent electrode layers 31 and the second transparent electrode layers 41 while causing a probe pin to contact each pad portion, and the transparent electrode film can be prevented from being damaged during the measurement. In addition, when the first pad portions 33 and the second pad portions 34 are formed at both ends of the first transparent electrode layers 31, the dielectric constants and thicknesses of the members located near both ends of the first transparent electrode layers 31 can be the same. Thus, it is possible to improve the uniformity of the capacitance distributions near the ends of the first transparent electrode layers 31.

It is preferred that the opposing first pad portions 33 and second pad portions 34 are formed so as to have substantially the same widths. By so doing, the dielectric constants and thicknesses of the members located near both ends of the first transparent electrode layers can more assuredly be the same. Thus, the uniformity of the distribution of the capacitance values can be further improved. In addition, as shown in FIG. 7, it is preferred that the widths at which the first pad portions 33 and the second pad portions 34 are connected to the first transparent electrode layers 31 are substantially the same as the widths of the ends of the first transparent electrode layers 31. By so doing, the uniformity of the capacitance distribution is improved in the width direction of the first transparent electrode layers 31 as well. Thus, the uniformity of the capacitance distribution can more assuredly be improved.

Further, in the first embodiment and the second embodiment, the input device 1 has been described in which the first transparent substrate 30 and the second transparent substrate 40 are laminated to each other. However, the present invention is also applicable to an input device in which a transparent electrode layer is formed on each or one of front and back surfaces of a single transparent substrate to detect change of a capacitance value, and the same effect can be obtained.

EXAMPLES

Figure 9:
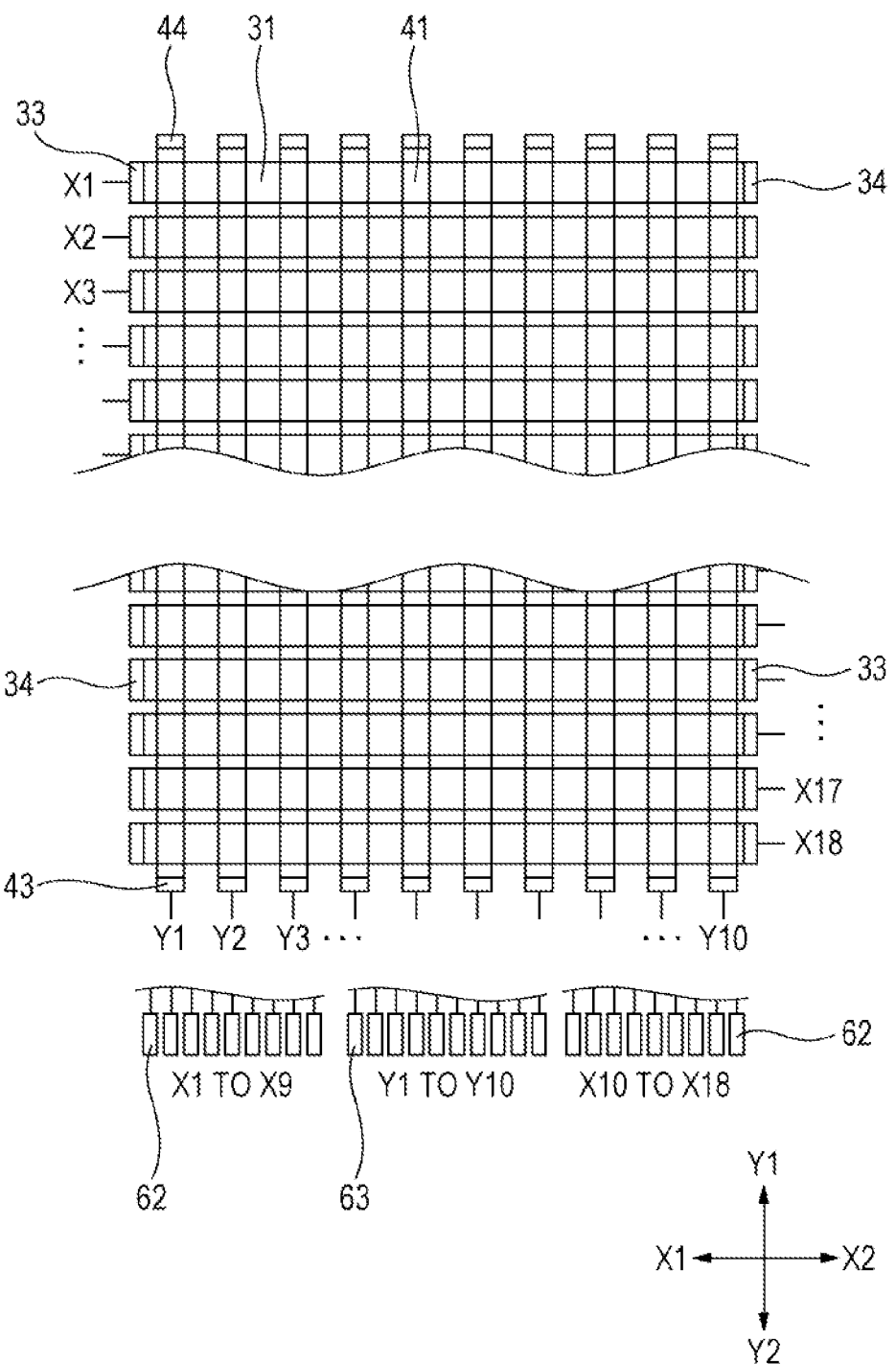
FIG. 9 is a schematic perspective plan view showing a transparent electrode pattern according to an example.

FIG. 9 shows a schematic perspective plan view of first transparent electrode layers 31 and second transparent electrode layers 41 in an input device used in an example. In the example, 18 first transparent electrode layers 31 (X electrodes) formed so as to extend in the X1-X2 direction and be arranged at intervals in the Y1-Y2 direction (X1 to X18). Ten second transparent electrode layers 41 (Y electrodes) are formed so as to extend in the Y1-Y2 direction and be arranged at intervals in the X1-X2 direction (Y1 to Y10).

In the input device used in the example, first pad portions 33 for connecting to first drawn wiring layers 32 (not shown) are formed at ends of the first transparent electrode layers 31 (X electrodes), and second pad portions 34 for electrical property inspection are formed at the other ends thereof. In addition, third pad portions 43 for connection are formed at ends of the second transparent electrode layers 41 (Y electrodes), and fourth pad portions 44 for electrical property inspection are formed at the other ends thereof. The first drawn wiring layers 32 and the second drawn wiring layers 42 are connected through first FPC connection portions 62 and second FPC connection portions 63, respectively, to a FPC 61. The input device of the example is connected to a control IC (Integrated Circuit) that is not shown, through the FPC 61. Meanwhile, an input device used in a comparative example has the same structure for the first transparent electrode layers 31, the second transparent electrode layers 41, and the first pad portions 33, but no second pad portion 34 is formed therein.

Although a part is omitted in FIG. 9, in the input device of the example, the first pad portions 33 are formed at the ends of the first transparent electrode layers 31 (X1 to X9) in the X1 direction and the second pad portions 34 are formed at the ends thereof in the X2 direction. In addition, the first pad portions 33 are formed at the ends of the first transparent electrode layers 31 (X10 to X18) in the X2 direction and the second pad portions 34 are formed at the ends thereof in the X1 direction. On the other hand, in the comparative example, no second pad portion 34 is formed at the ends of the first transparent electrode layers 31 (X1 to X9) in the X2 direction and at the ends of the first transparent electrode layers 31 (X10 to X18) in the X1 direction.

Figure 10A:
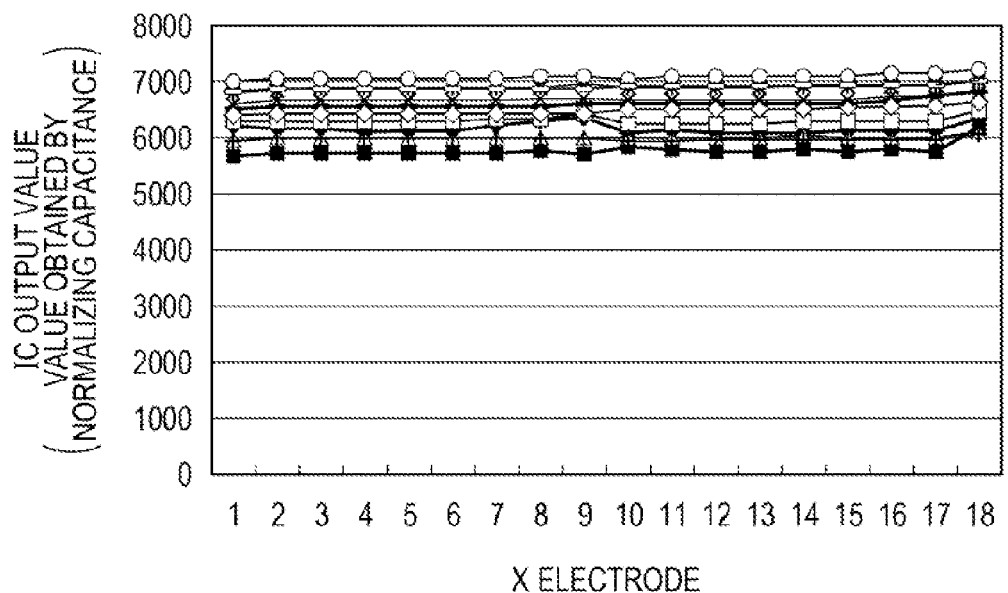
FIGS. 10A and 10B are graphs showing an IC output value at each of intersections between first transparent electrode layers and second transparent electrode layers in the example and a comparative example.
Figure 10B:
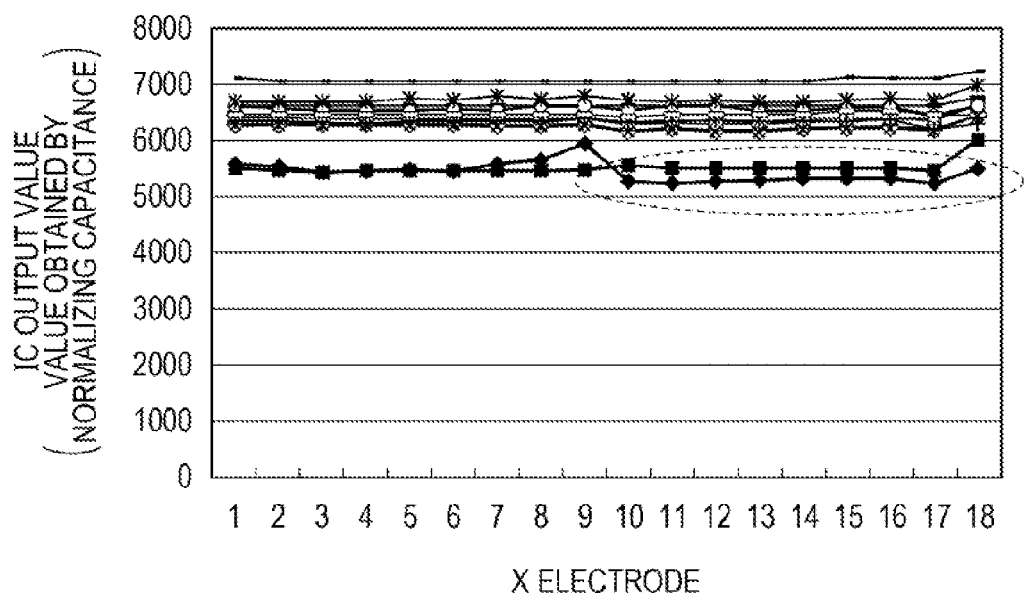
Figure 11:
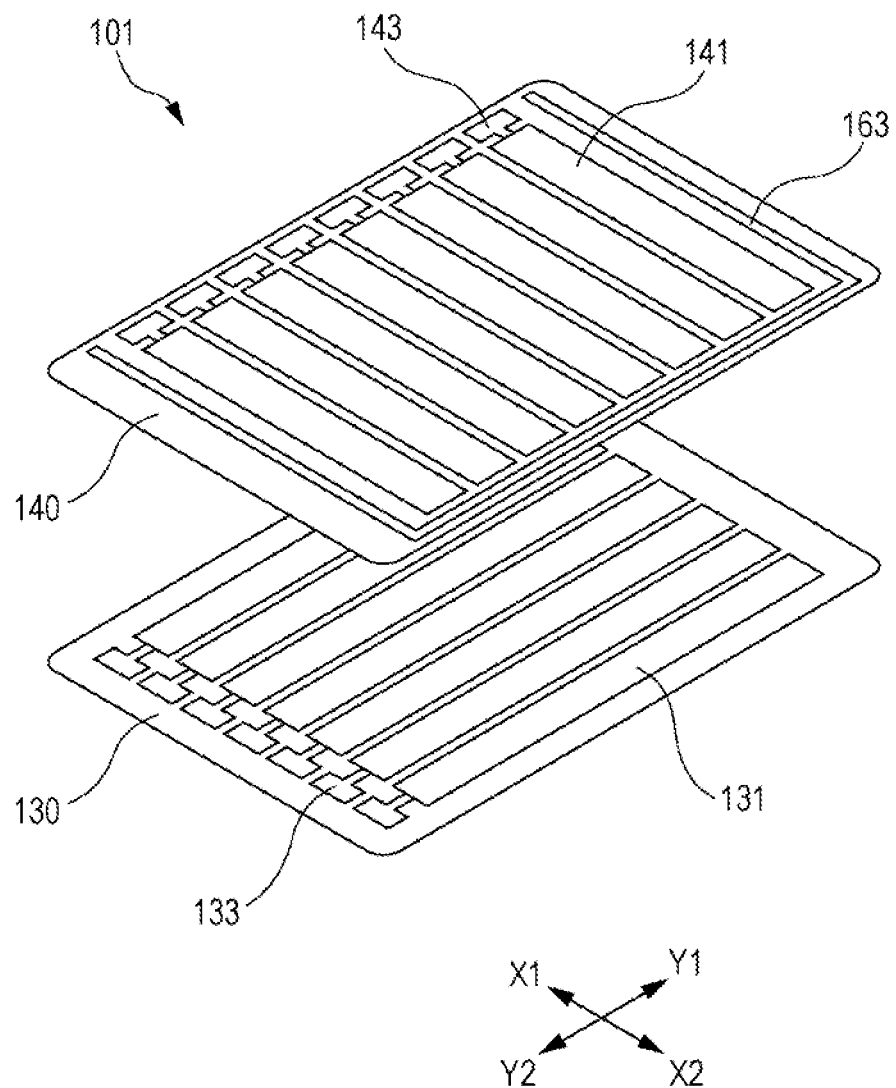
FIG. 11 is an exploded perspective view of an input device of a related art example.

FIGS. 10A and 10B are each a graph of a value calculated and outputted by an IC from a capacitance value at each of the intersections between the first transparent electrode layers 31 and the second transparent electrode layers 41 in the input device of the example or the comparative example. FIGS. 10A and 10B each show an IC output value calculated from each of capacitance values obtained by scanning intersections with X1 to X18 along, for example, the Y1 electrode among the second transparent electrode layers 41 (Y electrodes), and show a result obtained by scanning for each of the Y electrodes (Y1 to Y10). It should be noted that an IC output value in the example is a value obtained by normalizing a capacitance value, and FIGS. 10A and 10B each show a distribution of capacitances in the input device which were measured in a state where no finger or the like did not contact the input surface.

As shown in FIG. 10A, in the input device of the example, the IC output value measured by scanning the intersection with each X electrode along a Y electrode (the value obtained by normalizing the capacitance value) is substantially constant. FIG. 10B shows a graph obtained when measurement was performed on the input device of the comparative example by the same method. In particular, as significantly shown in a region surrounded by a dotted line, the IC output value (the value obtained by normalizing the capacitance value) greatly decreases at X10 to X18 at which no second pad portion 34 is formed, as compared to that at X1 to X9 at which the first pad portions 33 are formed. In particular, the difference between the IC output values (the values obtained by normalizing the capacitance values) at locations in X9 and X10 is about 800, the capacitance distribution is ununiform between the location where the first pad portion 33 is formed and the location where no second pad portion 34 is formed. Further, while the range of the IC output values (the values obtained by normalizing the capacitance values) at all the intersections in the comparative example is about 2000, the range of the IC output values (the values obtained by normalizing the capacitance values) at all the intersections in the example is about 1500 and is narrowed. Thus, the uniformity of the IC output value (the value obtained by normalizing the capacitance value) is improved in the entirety of the input region 21.

From the results of FIGS. 10A and 10B, it is indicated that by forming the first pad portion 33 for connection and the second pad portion 34 for electrical property inspection at both ends of each first transparent electrode layer 31, it is possible to improve the uniformity of the capacitance distribution in the input region 21.

What is claimed is:

1. An input device comprising:
   a light-transmissive substrate;
   a plurality of transparent electrode layers formed in an input region of the substrate, the plurality of transparent electrode layers being configured to detect change of a capacitance value; and
   a wiring layer formed on a non-input region of the substrate surrounding the input region,
   wherein each of the plurality of transparent electrode layers is provided with a first pad portion electrically connected to one end thereof, and a second pad portion electrically connected to another end thereof, the first pad portion providing an electrical connection between the wiring layer and the corresponding transparent electrode layer, the second pad portion providing a measuring point for an electrical property of each of the plurality of transparent electrode layers during a manufacturing process,
   and wherein the first pad portion and the second pad portion are made of a metallic material and have substantially a same width.

2. The input device according to claim 1, wherein the first pad portion and the second pad portion have widths that are substantially the same as that of the corresponding transparent electrode layer.

3. The input device according to claim 1, wherein each of the plurality of transparent electrode layers comprises a plurality of transparent electrodes extending in a first direction and arranged at an interval in a second direction intersecting the first direction, the first and second pad portions being provided to each of the plurality of transparent electrodes, the input device further comprising:
   connection portions formed in the non-input region of the substrate, configured to be connected to a flexible printed board, wherein the wiring layer includes a plurality of wiring patterns electrically connecting the connection portions to each of the plurality of transparent electrodes via the corresponding first pad portions.

4. The input device according to claim 1, wherein the first and second pad portions are laminated on corresponding end portions of each of the plurality of transparent electrode layers,
   and wherein the wiring layer includes:
      a first layer formed of a same material as the transparent electrode; and
      a second layer laminated on the first layer, the second layer formed of a same material as that of the first and second pad portions.

5. The input device according to claim 1, further comprising:
   a plurality of second transparent electrode layers facing the plurality of transparent electrode layers with a second light-transmissive substrate interposed therebetween,
   wherein a capacitive coupling between the first pad portion and a corresponding second transparent electrode layer is substantially the same as a capacitive coupling between the second pad portion and the corresponding second transparent electrode layer.

6. The input device according to claim 1, wherein the second pad portion is not electrically connected to the wiring layer.

7. The input device according to claim 1, wherein the first pad portion and the second pad portion provide substantially the same dielectric constant at both ends of a corresponding transparent electrode layer.

8. The input device according to claim 1, wherein the first pad portion and the second pad portion provide substantially the same thickness at both ends of a corresponding electrode layer.

* * * * *